(12) United States Patent
Linetskiy

(10) Patent No.: US 10,467,084 B2
(45) Date of Patent: Nov. 5, 2019

(54) KNOWLEDGE-BASED SYSTEM FOR DIAGNOSING ERRORS IN THE EXECUTION OF AN OPERATION

(71) Applicant: Oracle International Corporation, Redwood Shores, CA (US)

(72) Inventor: Sergey Linetskiy, Concord, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 15/624,540

(22) Filed: Jun. 15, 2017

(65) Prior Publication Data

US 2018/0365092 A1 Dec. 20, 2018

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0757* (2013.01); *G06F 2201/805* (2013.01); *G06F 2201/835* (2013.01); *G06F 2201/86* (2013.01)

(58) Field of Classification Search
CPC ............... G06F 11/079; G06F 11/0709; G06F 11/0757; G06F 11/006; G06F 11/07; G06F 11/0703; G06F 11/0766; G06F 11/0769; G06F 11/0775; G06F 11/0781; G06F 11/0787; G06F 11/0793; G06F 11/3072; G06F 11/3075; G06F 11/3086; G06F 11/321; G06F 11/324; G06F 11/327; G06F 11/3604; G06F 11/3612; G06F 11/362; G06F 11/366; G06F 2201/805; G06F 2201/835; G06F 2201/86
See application file for complete search history.

(56) References Cited

U.S. PATENT DOCUMENTS

| | | | |
|---|---|---|---|
| 6,556,950 B1 * | 4/2003 | Schwenke | G05B 17/02 700/83 |
| 9,026,550 B2 * | 5/2015 | Fradkin | G06F 16/245 707/769 |
| 2005/0172162 A1 * | 8/2005 | Takahashi | G06F 11/0709 714/4.4 |
| 2015/0379424 A1 * | 12/2015 | Dirac | G06N 20/00 706/12 |
| 2017/0011302 A1 * | 1/2017 | Heckman | G06N 5/047 |
| 2018/0113773 A1 * | 4/2018 | Krishnan | G06F 11/0706 |
| 2018/0260268 A1 * | 9/2018 | Madsen | G06F 11/0727 |

* cited by examiner

*Primary Examiner* — Anthony J Amoroso
(74) *Attorney, Agent, or Firm* — Invoke

(57) ABSTRACT

Operations include identifying an error generated by a primary operation. The event analysis system may determine that the primary operation depends on one or more lower-level operations. The event analysis system compares a log file, for the lower-level operation, to a valid event pattern for the lower-level operation. If the event analysis system identifies one or more events in the log file for the lower-level operation which do not match the valid event pattern for the lower-level operation, then the event analysis system presents or selects the set of events, in the log file for the lower-level operation, for error analysis corresponding to the error generated by the primary operation.

20 Claims, 7 Drawing Sheets

KNOWLEDGE-BASED SYSTEM FOR DIAGNOSING ERRORS IN THE EXECUTION OF AN OPERATION

TECHNICAL FIELD

The present disclosure relates to information system monitoring and analysis. In particular, the present disclosure relates to analyzing and correlating sequences of events.

BACKGROUND

A log file is a file that includes events executed by hardware or software. Log files may include information such as a timestamp for an event, the name of an event, an IP address associated with an event, and an identification number for an event. Events, in a log file, may be used in diagnosing errors or latencies in a system.

In a distributed environment, log files from multiple sources may be combined. The combined log files may be stored to a data repository. Analyzing events in distributed environments usually requires the participation of several teams consisting of experts in a particular field, such as networking, server hardware, and applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. EVENT ANALYSIS SYSTEM
3. KNOWLEDGE BASE STRUCTURE
4. DIAGNOSING ERRORS IN THE EXECUTION OF AN OPERATION
5. MULTIPLE ERROR SOURCES
    A. SELECTING LOWEST-LEVEL OPERATION FOR ERROR ANALYSIS
    B. REPORTING ALL ERROR-GENERATING EVENTS FOR ERROR ANALYSIS
6. EVENT REPORTING
7. MISCELLANEOUS; EXTENSIONS
8. HARDWARE OVERVIEW

1. General Overview

One or more embodiments include diagnosing errors generated during the execution of an operation(s), using an event analysis system. The event analysis system develops a knowledge base including both (a) dependency relationships between different operations and (b) valid event patterns associated with the successful execution of operations. The event analysis system uses the knowledge base to identify at least one event of an operation which is a root cause of an error of another operation.

In an embodiment, the event analysis system (may be referred to herein as "system") detects an error generated by a primary operation. The system may determine that the primary operation depends on one or more lower-level operations which may further depend on additional lower-level operations (primary operation also depends on the additional lower-level operations). Responsive to determining that the primary operation depends on one or more lower-level operations, the system obtains a log file for at least one of the lower-level operations.

The log file for the lower-level operation includes events corresponding to the lower-level operation. The system compares the log file, for the lower-level operation, to a corresponding valid event pattern for the lower-level operation. Based on the comparison operation, the system identifies one or more events, corresponding to the lower-level operation, which do not match the valid event pattern. The system presents or selects the one or more non-matching events, corresponding to the lower-level operation, for error analysis for the error generated by the primary operation. The error analysis is used to address the error generated by the primary operation.

One or more embodiments described in this Specification and/or recited in the claims may not be included in this General Overview section.

2. Event Analysis System

Figure 1:
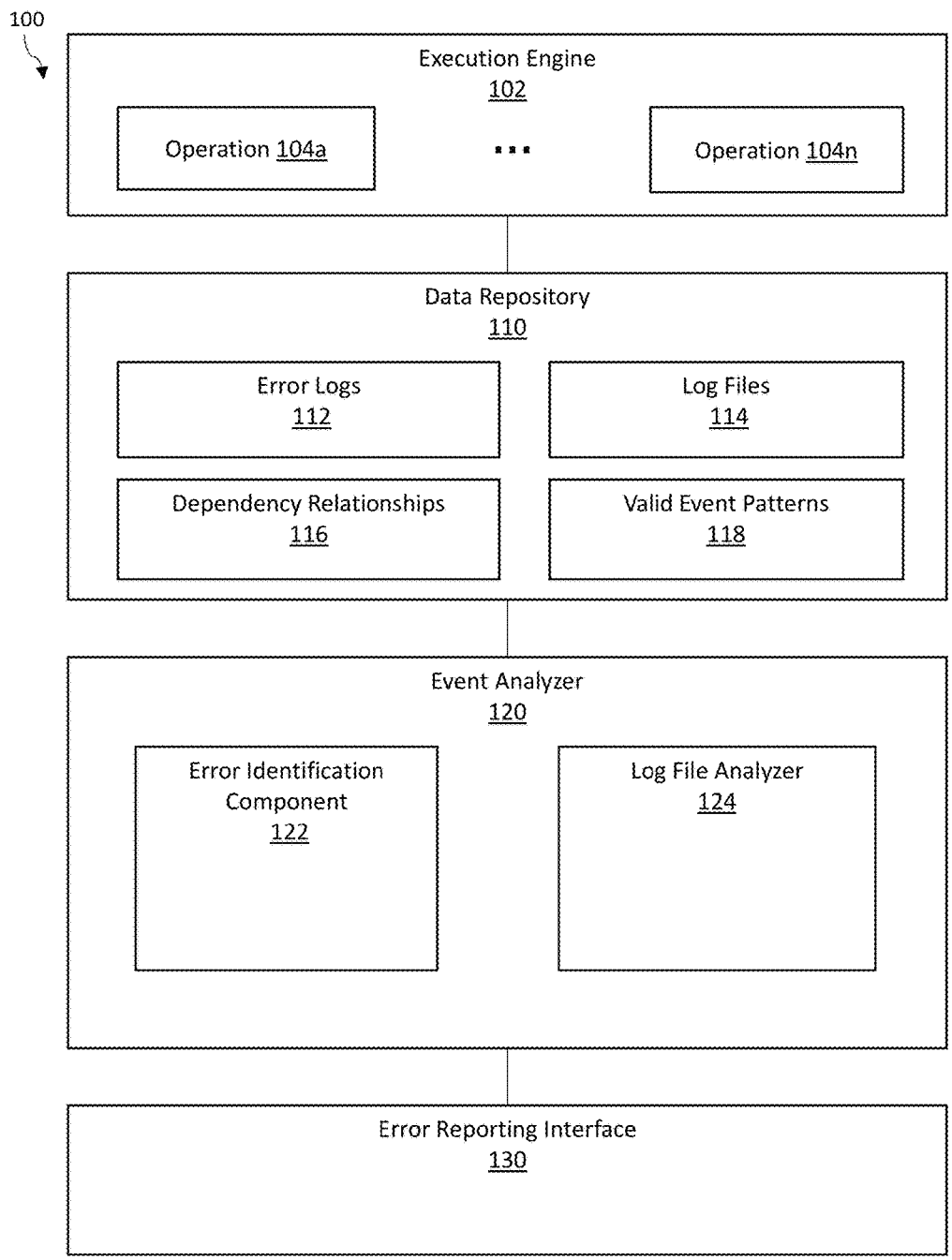
FIG. 1 illustrates an event analysis system in accordance with one or more embodiments.

FIG. 1 illustrates an event analysis system 100 in accordance with one or more embodiments. The event analysis system 100 is a system for detecting a cause of an error or otherwise addressing the error. As illustrated in FIG. 1, the event analysis system 100 includes an execution engine 102, data repository 110, event analyzer 120, and error reporting interface 130. In one or more embodiments, the event analysis system may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, an operation (operations 104a, ..., 104n) is a set of one or more instructions to be executed.

Examples of operations include, but are not limited to, creating an instance of a Virtual Machine (VM), creating a disk on a VM, storing customer information to a database, and generating a user interface. Operations may comprise events such as the start of the operation, the stop of the operation, and querying a database. A primary operation (also referred to herein as a higher-level operation) may use a secondary operation (also referred to herein as a lower-level operation) to perform a task. For example, a primary operation generates a user interface. The primary operation calls a secondary operation to render a component of the user interface (e.g., a map). As another example, a primary "start orchestration" operation defines how to start a VM instance and corresponding resources, such as block Input/Output (I/O) storage (virtual disk). The start orchestration operation may depend on hundreds of lower-level operations. Lower-level operations may, for example, create disks for hundreds of respective VMs.

Operations within a dependency chain may be of a same type or different types. Operations of a same type may include a same set of steps. Operations of a same type may include the same keywords or compute values for the same variable. The following are examples of operation types:

Create data table—create a data table
Create UI—create a user interface
Render map—render a map on a user interface
Drive—drive a car
Check condition—check a condition required to drive a car
Start orchestration—defines how to start a VM instance and resources of the VM instance
Create VM instance—creates an instance of a VM
Add storage attachment—add a storage attachment to a VM
Create storage volume—create a storage volume An operation of type start orchestration depends on at least one operation of type create VM instance. An operation of type create VM instance depends on at least one operation of type add storage attachment.

In an embodiment, the data repository 110 is any type of storage unit and/or device (e.g., a file system, database, collection of tables, or any other storage mechanism) for storing data. Further, the data repository 110 may include multiple different storage units and/or devices. The multiple different storage units and/or devices may or may not be of the same type or located at the same physical site. Furthermore, the data repository 110 may be implemented or may execute on the same computing system as the execution engine 102, the event analyzer 120, and the error reporting interface 130. Alternatively or additionally, the data repository 110 may be implemented or executed on a computing system separate from the execution engine 102, the event analyzer 120, and the error reporting interface 130. The data repository 110 may be communicatively coupled to the execution engine 102, the event analyzer 120, and the error reporting interface 130 via a direct connection or via a network. The data repository 110 stores information about operations and events. The data repository may store error logs 112, log files 114, dependency relationships 116, and valid event patterns 118.

In an embodiment, the error logs 112 are logs which capture information about errors in a system. An error log 112 may include a timestamp indicating the time at which an error was detected. An error log 112 may include events associated with an error. An error log 112 may include entries associated with many different operations in many different subsystems.

In an embodiment, the log files 114 are records of events. Log files 114 may include information such as a timestamp for an event, the name of an event, an IP address associated with an event, and an identification number for an event. The data repository may store log files for events that occurred across multiple computing systems in a distributed environment. A log file 114 may include a key, an IP address, and/or terminology specific to a particular operation. The records of events in the log files 114 may be used in diagnosing errors or latencies in a system.

Figure 2:
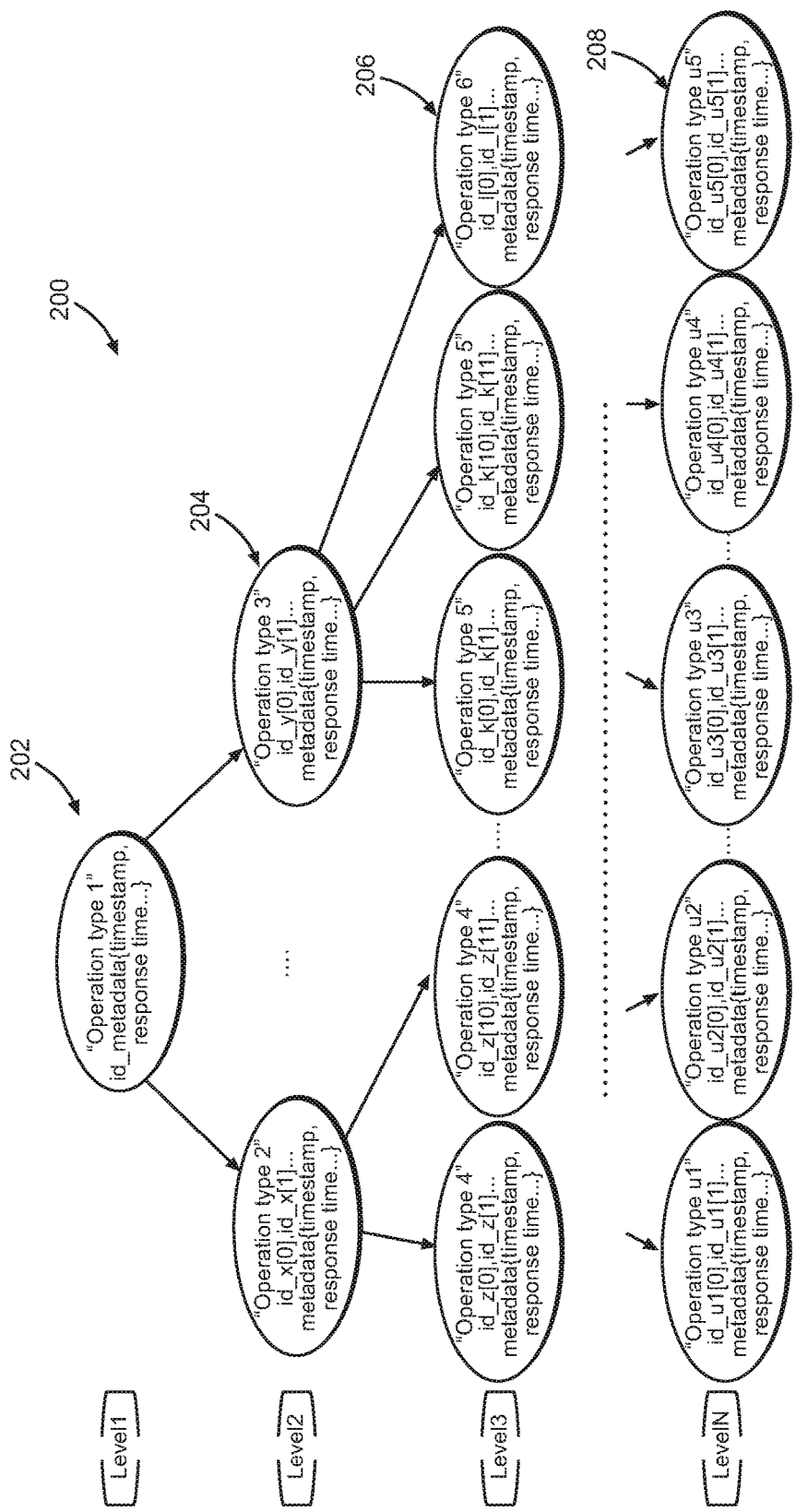
FIG. 2 illustrates a knowledge base structure in accordance with one or more embodiments.

In an embodiment, the dependency relationships 116 describe how operations relate to one another. Dependency relationships 116 may indicate that an operation depends on one or more other operations identified by operation type or operation instance. If successful completion of a primary operation requires successful completion of a particular lower-level operation, then the primary operation "depends" on the particular lower-level operation. A primary operation may depend on multiple levels of lower-level operations. The dependency relationships 116 may be represented, for example, as a hierarchical tree structure, or dependency tree (as illustrated in FIG. 2). A dependency tree may include a plurality of nodes, corresponding to a plurality of operations of respective operation types.

In an embodiment, dependencies may be determined based on system architecture. As an example, a system architecture defines a parent programming construct Car. The parent programming construct Car declares a child programming construct Wheels. The parent programming construct Car also declares a method Drive( ) Drive( ) calls a method CheckCondition( ) declared by the child programming construct Wheels. Accordingly, the operation corresponding to the method Drive( ) depends on the operation corresponding to the method CheckCondition( ). The system determines that the methods declared by a parent programming construct depend on the methods declared by a child programming construct. As a result, the system determines that the method Drive( ) declared by Car depends on the method CheckCondition( ) declared by Wheels.

Alternatively or additionally, dependency relationships are determined based on expert input. For example, each of a set of operations may correspond to a method defined by an Application Programming Interface (API). A system may present a user interface configured for receiving input that specifies dependencies between different methods.

In an embodiment, a valid event pattern 118 includes one or more events that are executed when a particular operation is executed successfully. Valid event patterns 118 may define an operation type of each of a sequence of events. A valid event pattern 118 may be represented, for example, by a JavaScript Object Notation (JSON) definition, or an Extensible Markup Language (XML) script. A valid event pattern may be stored in metadata associated with (a) an instance of a particular operation, (b) a node in the dependency tree associated with the particular operation, and/or (c) a type corresponding to the particular operation.

A valid event pattern 118, stored in data repository 110, may include a sequence of events as defined by an industry expert. Alternatively or additionally, a valid event pattern 118 may include a sequence of events as determined via analysis of an event history corresponding to a successfully executed operation. An event history for an operation of a particular type may be used to determine valid event patterns for other operations of the same particular type.

In an embodiment, the execution engine 102 includes hardware and/or software components for executing operations (e.g., operations 104a, . . . , 104n). The execution engine 102 may generate error logs and/or log files for operations executed by the execution engine. The execution engine may transmit error logs 112 and/or log files 114 to the data repository 110 for storage. Operations may be executed by multiple execution engines across multiple computing systems, or by a single execution engine.

In an embodiment, the event analyzer 120 includes hardware and/or software configured to analyze events. The event analyzer may identify errors using an error identification component 122. The event analyzer may analyze log files using a log file analyzer 124.

The event analyzer 120 may be triggered in real-time in response to detection of an error. Alternatively or additionally, the event analyzer 120 may be initiated in response to the system receiving user input requesting event analysis. The event analyzer 120 may analyze an event in real time, as the event is occurring. Alternatively or additionally, the event analyzer 120 may operate offline by traversing error logs and/or log files in the data repository.

In an embodiment, the error identification component 122 identifies and characterizes errors for analysis. The error identification component 122 may monitor error logs 112 to identify an error generated by a particular operation. The error identification component 122 may determine the operation type associated with a particular error using the dependency relationships 116 and/or valid event patterns 118 stored in the data repository.

In an embodiment, the log file analyzer 124 analyzes log files for dependency relationships and/or valid event patterns. The log file analyzer 124 may traverse dependency relationships 116 to find a particular lower-level operation upon which a primary operation depends. The log file analyzer 124 may traverse dependency relationships 116 to further find one or more additional lower-level operations upon which the particular lower-level operation depends. The log file analyzer 124 may compare valid event patterns 118 to log file entries 114, to determine whether a log file entry matches a valid event pattern.

In an embodiment, the error reporting interface 130 is a user interface (UI), such as a graphical user interface (GUI). The error reporting interface 130 may present one or more events for error analysis. The error reporting interface 130 may display error logs 112 and/or log files 114, in whole or in part. Alternatively, the error reporting interface 130 may communicate with error-handling software, transmitting information about events for error analysis.

3. Knowledge Base Structure

FIG. 2 illustrates a tree of dependency relationships 200, in accordance with one or more embodiments. Dependency relationships and/or valid event patterns may be stored using a tree knowledge base structure 200. The tree structure 200 may include a series of nodes (e.g., nodes 202-208). Each node represents an operation type. The nodes are divided into dependency levels (Level 1, Level 2, Level 3, ..., Level N). The dependency levels describe how a primary operation relates to one or more other operations.

As described above, there are many different types of operations. Examples below refer simply to Operation Type 1, Operation Type 2, Operation Type 3, etc. for clarity in the explanation of the dependency tree.

In the dependency tree pictured in FIG. 2, there is one primary operation type, Operation Type 1 202, at Level 1. Other tree structures may include multiple primary operations. A primary operation, such as Operation Type 1, is at the root of the tree. No other operations, illustrated in FIG. 2, depend upon the primary operation. Operation Type 1 depends on all lower-level operations below Level 1 in the dependency tree, as is indicated by the arrows pointing to the lower-level operations. All lower-level operations must be successfully executed to complete Operation Type 1.

Operations at Level 2 (e.g., Operation Type 3 204) must be successfully executed to complete the primary operation 202. Operations at Level 3 (e.g., Operation Type 6 206) must be successfully executed to complete the operations at Level 2. Level 3 operations must also be successfully executed to complete the primary operation 202. The primary operation indirectly depends on the Level 3 operations. The tree structure 200 may include any number of levels N with respective operations. Operations at the last Level N (e.g., Operation Type u5 208) do not depend on any other operations.

For each operation type in the hierarchy, the system stores valid event patterns related to the particular operation type. Examples of valid event patterns are described above. Alternatively or additionally, dependency relationships and valid event patterns may be stored by other means, including, but not limited to, a data table or a directed graph. While the system is discussed below with respect to a dependency tree, it is to be understood that dependency relationships and valid event patterns may be stored and analyzed using other structures.

4. Diagnosing Errors in the Execution of an Operation

Figure 3:
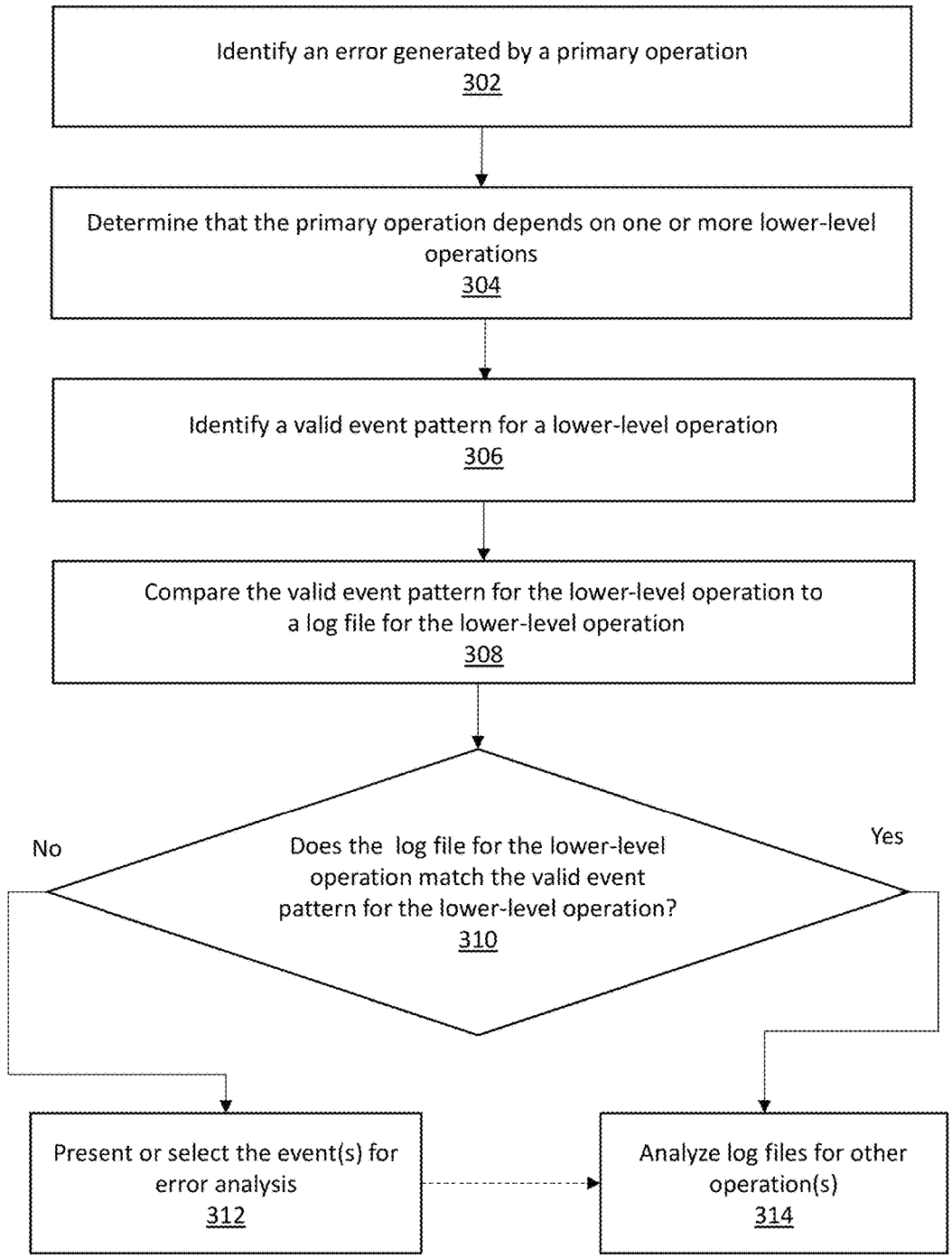
FIG. 3 illustrates an example set of operations for diagnosing errors in the execution of an operation in accordance with one or more embodiments.

FIG. 3 illustrates an example set of operations for diagnosing errors in the execution of an operation, in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In one or more embodiments, the event analyzer identifies an error generated by an operation (referred to hereinafter as a "primary operation") (Operation 302). The event analyzer may receive a notification that an error has been generated by a primary operation. The event analyzer may itself determine that an error has been generated by a primary operation. The event analyzer may analyze log files to determine whether an error has been generated by a primary operation.

For example, the event analyzer may determine that each successful operation generates a corresponding log with a particular string of words. The event analyzer may check whether the particular textual string is present in the log file for a primary operation. If the particular textual string is not present in the log file, then the event analyzer determines that an error has been generated by the primary operation. If the particular textual string is present in the log file, then the event analyzer determines that no error has been generated by the primary operation.

As another example, the event analyzer may identify an error by determining that a completion time of an operation is not within an acceptable range from a start time of that operation. The event analyzer may determine that the execution time (computed from the start time to the completion time) of the operation exceeds a threshold execution time. The execution time exceeding the threshold execution time may be identified as an error. Alternatively or in addition, the event analyzer may determine that the execution time of a particular step of an operation exceeds a threshold execution time configured for the particular step of the operation. The execution time of the particular step exceeding the threshold execution time configured for the particular step may be identified as an error.

In an embodiment, the event analyzer determines that the primary operation depends on one or more lower-level operations (Operation 304). As an example, a dependency mapping table stores a set of dependencies for each operation. The event analyzer may execute a query on the dependency mapping table to determine that the primary operation depends on a set of one or more lower-level operations. The primary operation may directly or indirectly depend on each of the lower-level operations identified via the query.

The event analyzer may traverse a dependency tree, analyzing lower-level operations in order of dependency, to determine that a primary operation depends on a set of one or more lower-level operations. The event analyzer may determine that a primary operation depends on a lower-level operation, based on links in the dependency tree. For example, the dependency tree pictured in FIG. 2 shows that an operation of type 1 is followed, at least, by an operation of type 2.

The event analyzer may determine that a primary operation indirectly depends on a lower-level operation. For example, the event analyzer determines that a primary operation depends on a second operation. The event analyzer determines that the second operation depends on a third operation. The event analyzer determines, based on the above dependencies, that the primary operation indirectly depends on the third operation.

In an embodiment, the event analyzer identifies a valid event pattern for a lower-level operation (Operation 306). The event analyzer may locate metadata, associated with the lower-level operation, which includes a valid event pattern for the lower-level operation.

The event analyzer may identify a valid event pattern for a lower-level operation based on a type of the lower-level operation. The event analyzer may query a database of valid event patterns with a type of the lower-level operation. The event analyzer may obtain metadata corresponding to a valid event pattern for a lower-level operation, from a node in a dependency tree which corresponds to the lower-level operation.

In an embodiment, metadata associated with a lower-level operation defines a part of the valid event pattern for the lower-level operation. Another part of the valid event pattern for the lower-level operation is determined at runtime. As an example, the output of a primary operation or a log file associated with the execution of the primary operation may include a particular textual string. The particular textual string may correspond to a portion of the valid event pattern for the lower-level operation.

As an example, based on metadata and/or the output of another operation, the event analyzer determines that a valid event pattern for an operation "start orchestration" includes the following components:
 a. PUT/orchestration/Compute-US6Z12BASEACC346585425/joe.doe@oracle.com/testCreateOrchestrationWithStorageAttachment_autotest_78d81d0ab5-0530-002245254?action=START
 b. borchestrationmanager.container
 c. testCreateOrchestrationWithStorageAttachment_autotest_78d81d0ab5-0530-002245254
 d. (state=ready, version=2) successfully updated in database The valid event pattern for the operation "start orchestration" recited above includes (4) components. The third component "testCreateOrchestrationWithStorageAttachment_ autotest_78d81d0ab5-0530-002245254" of the valid event pattern is the output of another operation and is determined at runtime. If the "start orchestration" operation is successfully executed without an error, the log file for the "start orchestration" operation will include the above (4) components. If the "start orchestration" operation is not successfully executed, then one or more of the above (4) components may not necessarily be found in the log file for the "start orchestration" operation.

As another example, based on metadata and/or the output of another operation, the event analyzer determines that a valid event pattern for an operation "create VM instance" includes:
 a. [bsite.storage]
 b. Creating attachment objects for instance /Compute-US6Z12BASEACC346585425/joe.doe@oracle.com/testCreateOrchestrationWithStorageAttachment_autotest_78d81d0ab5-0530-002245254
 c. Started instance
 d. 980c4e6f-e53c-4708-a998-84a057d671b7
 e. on node The valid event pattern for the operation "create VM instance" recited above includes (5) components. The fourth component "980c4e6f-e53c-4708-a998-84a057d671b7" of the valid event pattern is the output of another operation and is determined at runtime. If the "create VM instance" operation is successfully executed without an error, the log file for the "start orchestration" operation will include the above (5) components. If the "create VM instance" operation is not successfully executed, then one or more of the above (5) components may not necessarily be found in the log file for the "start orchestration" operation.

In an embodiment, the event analyzer compares the valid event pattern for the lower-level operation to a log file for the lower-level operation (Operation 308). Based on the comparison, the event analyzer determines whether the log file for the lower-level operation matches the valid event pattern for the lower-level operation (Operation 310).

Comparing the valid event pattern to the log file may include checking whether each portion of the valid event pattern is found in the log file. Comparing may further include checking whether each portion of the valid event pattern is found in the log file in a same order as included in the valid event pattern.

In an embodiment, the event analyzer may optimize the comparison process by comparing the valid event pattern to a portion of the log file. The event analyzer may obtain rules for extracting information from the log file for the lower-level operation for comparison with the valid event pattern for the lower-level operation. The event analyzer may compare, for example, textual strings, event sequences, and operation sequences identified in the valid event pattern.

The event analyzer may compare a valid event pattern to a log file by analyzing the execution time of one or more events. The event analyzer may determine, based on a valid event pattern, that one event may be followed by another event within a particular time interval. For example, the event analyzer determines that a valid event pattern indicates that event A must be followed by event B within 1 second. The event analyzer determines an execution time recorded in a log file for event A. The event analyzer further determines if event B was recorded, in the log file, with an execution time that is within one second of the execution time of Event A. If event B is recorded with an execution time that is within one second of the execution time of Event A, then the event analyzer determines that the lower-level operation was successfully executed.

In an embodiment, the event analyzer may determine that the log file for an operation does not match a sequence of events corresponding to a valid event pattern. For example, the initial event in a valid event pattern must be of a particular type, and the initial event is not of that particular type. As another example, the event analyzer queries a JSON definition of valid event patterns, to determine that a valid event pattern for a lower-level operation includes the textual strings (a) create VM, (b) create disk, and (c) disk complete. A search of the log file detects the events create VM and create disk. However, the log file does not include the event disk complete. Detecting create disk without detecting disk complete may be used by the event analyzer to deduce that creation of the disk was initiated but was not completed. Accordingly, the event analyzer may determine that there was an error in creating the disk.

The event analyzer may determine whether a log file matches a valid event pattern based on execution time. As an example, a valid event pattern identifies 30 seconds as a maximum execution time of a particular operation. The event analyzer may calculate an execution time of an operation by determining the time interval between a start and a stop of the operation. The event analyzer may compare a calculated execution time to the maximum execution time, 30 seconds. If the execution time of the operation exceeds 30 seconds, then the operation does not match the valid event pattern. The event analyzer may determine that a failure has occurred in the execution of the operation based on the execution time of the operation exceeding the maximum execution time.

In an embodiment, the event analyzer determines whether the operation is synchronous (represented by a single event) or asynchronous (represented by two or more events). For asynchronous events, the event analyzer may determine a response time using start and end events associated with the operation. For synchronous events, the event analyzer may use a rule specific to synchronous operations to determine the response time of the synchronous operation.

If the log file for the lower-level operation does not match the valid event pattern for the lower-level operation, then the error reporting interface presents or selects the event(s) for error analysis (Operation 312). The error reporting interface may present the event in a user interface, so that an administrator can analyze the error. For example, the error reporting interface displays the message: "Error detected at VM 1001: disk creation failure." The error reporting interface may display a detailed error report, as described in Section 6. Alternatively or additionally, the error reporting interface may select an event for error analysis, and transmit information about the error to error-handling software.

The event analyzer may analyze log files for additional lower-level operations associated with the primary operation (Operation 314). Analyzing log files for additional lower-level operations may include repeating operations 306-312 for each of the additional lower-level operations. The event analyzer may select an operation for error analysis, based on dependency relationship of the operation with one or more other operations. For example, first the event analyzer analyzes a level 2 operation, which must be successfully executed to complete a primary operation. Next, the event analyzer analyzes a level 3 operation, based on a determination that the level 3 operation is a lower-level operation of the level 2 operation.

As an example, the event analysis system identifies an error generated by a primary operation, start orchestration. Start orchestration defines how to start a VM instance and resources of the VM instance. Data about system events is stored to Elasticsearch™, a big data repository. The dependency relationships and valid event patterns for the start orchestration operation are stored in the following JSON search definition:

```
[
  {
    "title": "orchestration",
    "index_pattern": "compute-usdc2-2016-05-*",
    "beginend": true,
        "regex_rt": "",
      "regex_rt_field": "",
    "search_pattern_start": "\"PUT /orchestration\" AND \"?action=START \" AND NOT \"nginx-frontend\" AND NOT \"nginx-admin-frontend\" AND NOT \"[brested.protocols.http.resources]\"",
      "search_start_fields": "",
        "search_pattern_end": "\"borchestrationmanager.container\" AND \"(state=ready, version=2) successfully updated in database\" AND \"{{sorchestrationID}}\" ",
      "search_end_fields": "",
        "regex_start": "message\\:.*@context:(?P<sorchestrationcontext>[0-9a-zA-Z_]*).*/orchestration(?P<sorchestrationID>.*)\\?action=START",
        "regex_end": "message\\:@context:(?P<eorchestrationcontext>.*)@ persist (?P<eorchestrationID>.*):",
        "time_threshhold": "10",
    "children": [
      {
        "title": "instance",
        "index_pattern": "compute-usdc2-2016-05-*",
        "beginend": true,
            "regex_rt": "",
            "regex_rt_field": "",
        "search_pattern_start": "\"[bsite.storage]\" AND \"Creating attachment objects for instance\" AND \"{{sorchestrationID}}\" ",
          "search_start_fields": "",
            "search_pattern_end": "\"Started instance\" AND \"{{sinstanceID}}\" AND \"on node\"",
          "search_end_fields": "",
            "regex_start": "message\\:@context:(?P<sinstancecontext>.*)@ Creating attachment objects for instance (.*/)(?P<sinstanceID>.*)",
          "regex_start_field": "message",
            "regex_end": "message\\:@context:(?P<einstancecontext>.*)@.*Started instance (?P<einstanceID>.*)",
          "regex_end_field": "message",
            "time_threshhold": "10",
```

```
        "children": [
            {
                "title": "storageattach",
                "index_pattern": "compute-usdc2-2016-05-*",
                "beginend": true,
                            "regex_rt": "",
                            "regex_rt_field": "",
                "search_pattern_start": "\"bsite.storage\" AND \"Successfully created attachment\" AND \"{{sinstanceID}}\" ",
                "search_start_fields": "",
                            "search_pattern_end":
"\"[bstoragemanager.attachment.message_handler_service]\" AND \"Updating state of attachment \" AND \"{{sstorageattachID}}\" ",
                "search_end_fields": "",
                            "regex_start":
"message\\:@context:(?P<sstorageattachcontext>.*)@ Successfully created attachment\\((?P<sstorageattachID>.*)\\) for",
                            "regex_end":
"message\\:@context:(?P<estorageattachcontext>.*)@ Updating state of attachment(?P<estorageattachID>.*) to",
                            "time_threshhold": "10"
            }
        ]
    }
]
},
```

The JSON search definition defines the dependencies between start orchestration, create TQM instance, and add storage attachment type operations.

Using the search definition, the event analyzer finds events for the primary operation (here, start orchestration). The event analyzer extracts the operations' IDs, to be used in searching lower-level operations. The event analyzer finds second level operations which must be successfully executed to complete the primary operation. The event analyzer uses the valid event patterns and dependency relationships to find textual strings characteristic of a successful operation on the second level. Next, the event analyzer finds third level operations which must be successfully executed to complete the secondary operations. The event analyzer executes a search for each element, to find textual strings characteristic of a successful operation on the third level. The event analyzer repeats finding the next-lower level operations, and searching for each element, until the last lower-level operation in the hierarchy has been searched.

Upon completing the search of all operations in the hierarchy, the error analyzer has determined that, for one instance of creating a storage attachment, the operation had an execution time of 30 seconds, exceeding the threshold execution time of 10 seconds. As a result, the error reporting interface displays: "Error at Operation ID 45377—Create Storage Attachment—Execution Time=30 seconds," along with metadata associated with the event.

5. Multiple Error Sources

A. Selecting Lowest-Level Operation for Error Analysis

In an embodiment, upon determining that the log files of multiple events in a dependency chain do not match valid event patterns, the event analyzer selects the lowest-level operation, of the multiple operations, for error analysis.

For example, subsequent to identifying an error generated by a primary operation, the event analyzer analyzes log files for a type 2 operation. The primary operation depends directly on the type 2 operation. The event analyzer determines that an event in the log file for the type 2 operation does not match a valid event pattern for the type 2 operation. The event analyzer continues to analyze log files for other operations. The event analyzer analyzes a type 3 operation, which must be successfully executed to complete the type 2 operation. The event analyzer determines that three events in a log file for the type 3 operation do not match a valid event pattern for the type 3 operation. The event analyzer then analyzes a type 4 operation, which must be successfully executed to complete the type 3 operation. The event analyzer determines that two events in a log file for the type 4 operation do not match a valid event pattern for the type 4 operation. The event analyzer then identifies a type 5 operation, which must be successfully executed to complete the type 4 operation. The event analyzer determines that the log file for the type 5 operation matches the valid event pattern for the type 5 operation. The event analyzer then analyzes a type 6 operation, which also must be successfully executed to complete the type 4 operation. The event analyzer determines that two events in a log file for the type 6 operation do not match a valid event pattern for the type 6 operation.

The event analyzer has identified errors in five operations, as the primary operation, the type 2 operation, the type 3 operation, the type 4 operation, and the type 6 operation do not match their respective valid event patterns. Whenever one or more higher-level operations (e.g., the primary operation, the type 2 operation, the type 3 operation, and the type 4 operation) experience errors while a lower-level operation (e.g., the type 6 operation) also experiences an error, the event analyzer determines that the higher-level operations are experiencing errors as a result of the lower-level operation. The event analyzer determines that the lower-level operation is the source of the error. Here, the event analyzer identifies the lower-level operation experiencing an error, the type 6 operation, as the source of the errors.

B. Reporting all Error-Generating Events for Error Analysis

In an embodiment, upon determining that log files of multiple events in a dependency chain do not match valid event patterns, the event analyzer generates an end-to end description of the errors.

As in the above example detailed in Section 4A, the event analyzer finds errors in five operations, a primary operation, a type 2 operation, a type 3 operation, a type 4 operation, and a type 6 operation. The error in the primary operation could be caused by failures in one or more lower-level operations of the primary operation. The system reports all operations in which an error was detected, for end-to-end error analysis. The system may display detailed event reporting information via the error reporting interface, as described below.

6. Event Reporting

The system may display, via the error reporting interface, data about events such as a hierarchy of events, a trend of latencies in operation response times, and metadata for use in searching the logs.

Figure 4A:
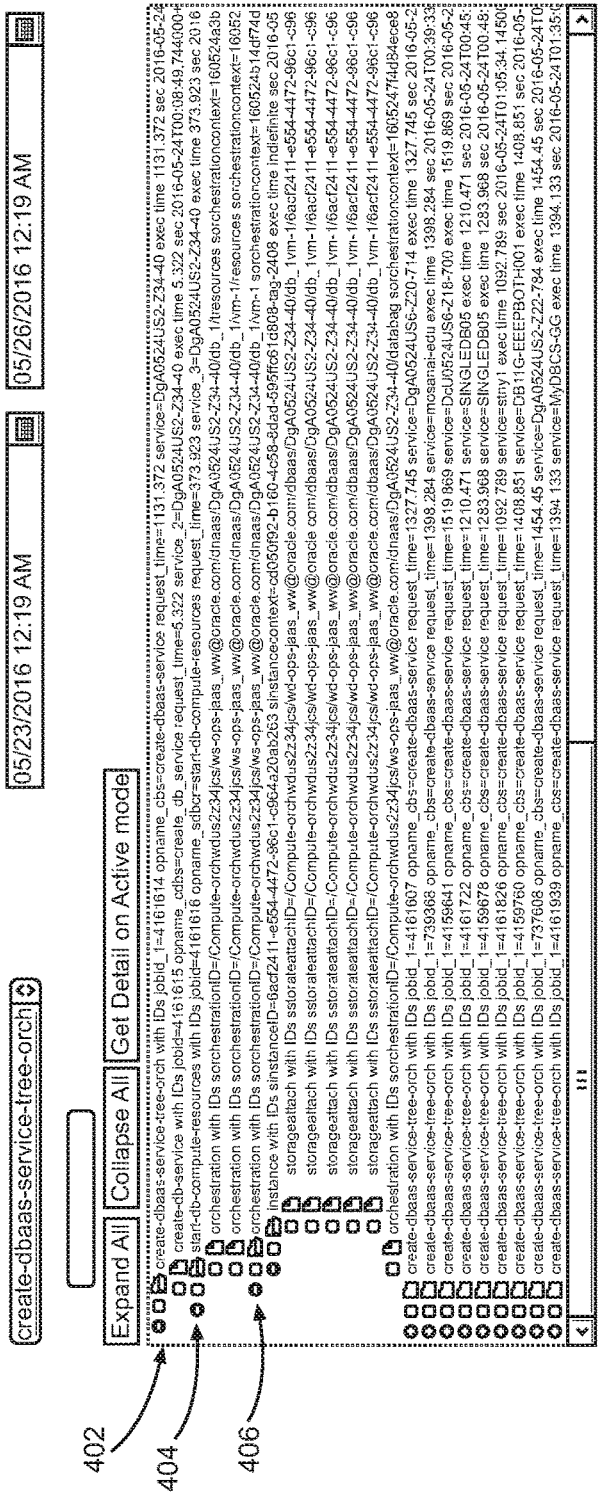
FIG. 4A illustrates a hierarchy of events in accordance with one or more embodiments.

FIG. 4A illustrates an example display of a hierarchy of events for end-to end tracing. In FIG. 4A, the error reporting interface displays the hierarchy of events determined by the event analyzer in a user-friendly manner. FIG. 4A shows an event hierarchy for a create service orchestration operation, from a platform as a service creation job down to compute objects. The error reporting interface displays the events within the create service orchestration operation. The first event within the create service orchestration operation is create service tree 402. The error reporting interface also displays the events for start compute resources operation 404 and start compute orchestration with IDs 406. Create service tree 402 depends on start compute resources 404, and, in turn, depends on start compute orchestration with IDs 406.

By displaying a hierarchy of the events for end-to-end tracing, the system enables a user to trace a failure or long execution time that occurred during provisioning. Alternatively or additionally, error handling software may use the hierarchy of events to address a failure or long execution time.

Figure 4B:
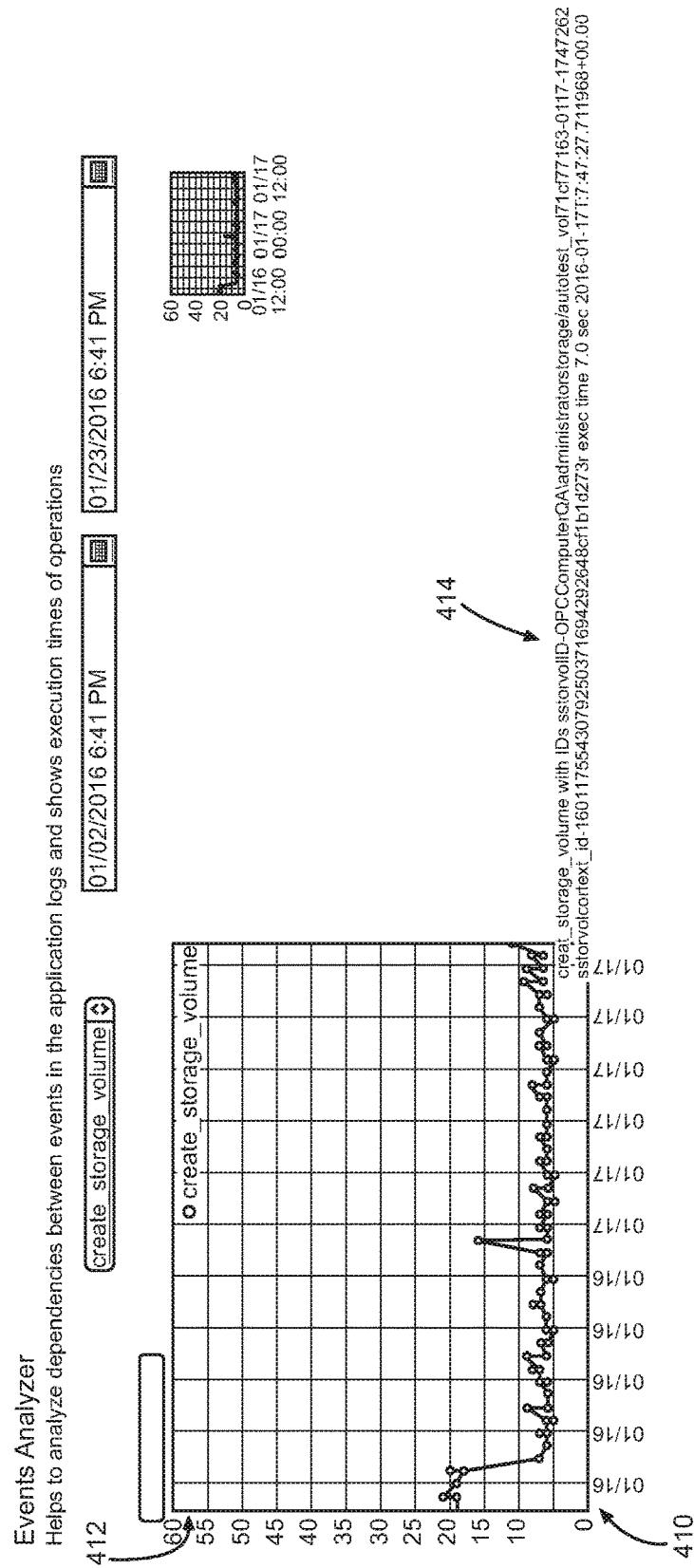
FIG. 4B illustrates a trend of latencies in accordance with one or more embodiments.

FIG. 4B illustrates an example display of a trend of latencies. The system may display a trend of latencies for an operation's response time, or for the creation of a particular operation. In FIG. 4B, the error reporting interface displays a trend of latencies for the operation create storage volume. The trend of latencies is shown as a graph of start time 410 vs. execution time 412, to show the execution times of events from the beginning to end of an operation.

The error reporting interface may display the trend of latencies using the execution times of some or all events in a chain of operations. The error reporting interface may display execution times for both synchronous and asynchronous operations. Each point in the trend of latencies may be associated with metadata 414. The error reporting interface may display the metadata 414 to a user. The error reporting interface may overlay metadata 414 on the graph in response to receiving the selection of a point on the graph from a user. Alternatively or additionally, the error reporting interface may display metadata in a separate window.

Figure 4C:
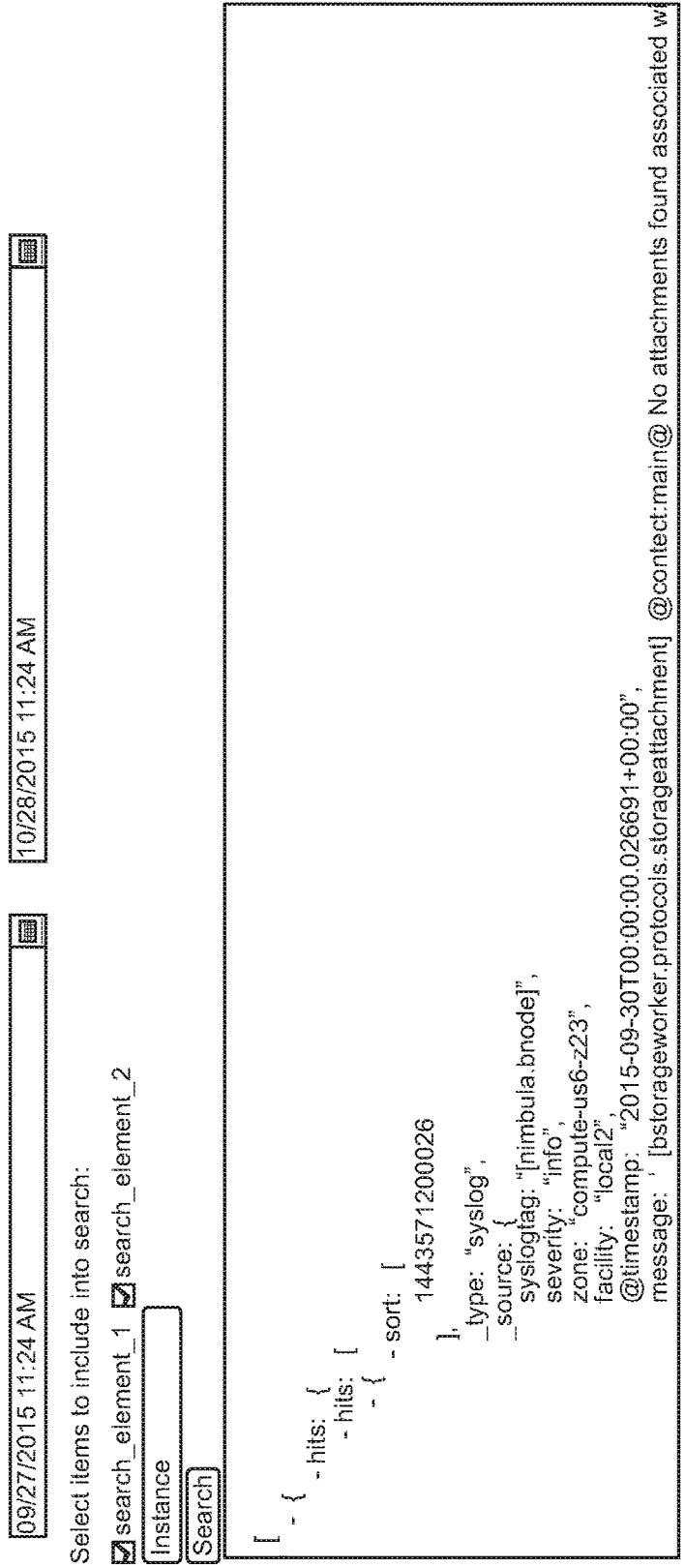
FIG. 4C illustrates a metadata search in accordance with one or more embodiments.

FIG. 4C shows an interface for searching using the metadata displayed in FIG. 4B. For example, based on the displayed metadata, a user can search logs for related information using an ID present in the logs (e.g., a Context ID or Exclusive Chip Identification (ECID)). Alternatively or additionally, error handling software may retrieve the metadata to search logs for addressing one or more errors.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
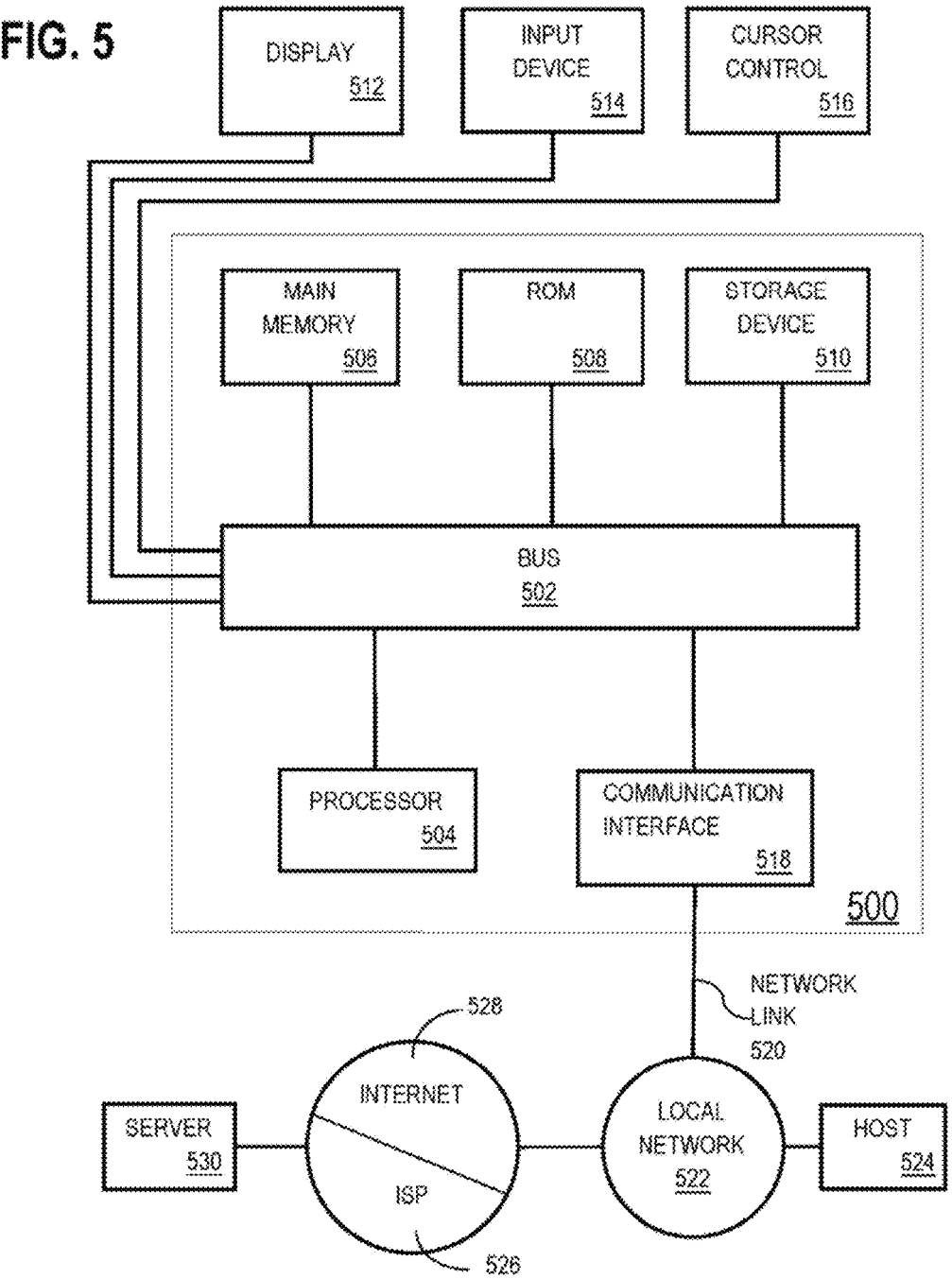
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510. Volatile media include dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying an error generated by a first operation of a first type;
   based on identification of the error, triggering and performing real-time event analysis comprising:
   determining that the first operation of the first type depends on a second operation of a second type;
   wherein determining that the first operation depends on the second operation comprises determining that the second operation must be completed prior to completion of the first operation;
   identifying a valid event pattern for the second operation based on metadata associated with the second operation;
   comparing a log file, for the second operation, to the valid event pattern for the second operation;

identifying a set of one or more events in the log file for the second operation of the second type which do not match the valid event pattern for the second operation of the second type, wherein the identifying includes:

determining, based on the valid event pattern, a time interval by which any event of a first event type must be followed by at least one event of a second event type;

determining that a first event, of the first event type, in the log file is not followed by any second event of the second event type within the time interval; and presenting or selecting the set of events, in the log file for the second operation, for error analysis corresponding to the error generated by the first operation.

2. The medium of claim 1, wherein determining that the first operation depends on the second operation comprises determining that the first operation depends on a third operation, and determining that the third operation depends on the second operation.

3. The medium of claim 1, wherein identifying the error comprises:

determining that any completion time of the first operation is not within a valid time range from a start time of the first operation.

4. The medium of claim 1, wherein the operations further comprise:

determining that the first operation depends on a plurality of operations by traversing a set of dependency relationships; and comparing valid event patterns for the plurality of operations to corresponding log files for the plurality of operations.

5. The medium of claim 1, wherein the operations further comprise:

identifying a valid event pattern for the first operation of the first type; and, subsequent to comparing the log file of the second operation to the valid event pattern for the second operation of the second type, comparing the valid event pattern for the first operation of the first type to a log file for the first operation of the first type.

6. The medium of claim 1, wherein the operations further comprise:

receiving user-defined relationship information;

determining that the first operation depends on a particular plurality of operations based on the user-defined relationship information.

7. The medium of claim 1, wherein the operations further comprise:

analyzing code to determine a plurality of dependency relationships between operations;

determining that the first operation depends on a particular plurality of operations based on the plurality of dependency relationships.

8. The medium of claim 1, wherein the operations further comprise:

determining that one or more events in a log file for a third operation does not match a valid event pattern for the third operation;

determining that one or more events in a log file for a fourth operation does not match a valid event pattern for the fourth operation;

identifying a lower-level operation of the third operation and the fourth operation; and selecting the lower-level operation as a source of the error or selecting the lower-level operation for error analysis.

9. The medium of claim 1, wherein the operations further comprise:

determining that one or more events in a log file for a third operation does not match a valid event pattern for the third operation;

determining that one or more events in a log file for a fourth operation does not match a valid event pattern for the fourth operation;

responsive to determining that the third operation depends on the fourth operation, selecting the fourth operation as a source of the error or selecting the fourth operation for error analysis.

10. A system comprising:

at least one device including a hardware processor;

the system configured to perform operations comprising:

identifying an error generated by a first operation of a first type;

based on identification of the error, triggering and performing real-time event analysis comprising:

determining that the first operation of the first type depends on a second operation of a second type;

wherein determining that the first operation depends on the second operation comprises determining that the second operation must be successfully completed prior to completion of the first operation;

identifying a valid event pattern for the second operation based on metadata associated with the second operation;

comparing a log file, for the second operation, to the valid event pattern for the second operation;

identifying a set of one or more events in the log file for the second operation of the second type which do not match the valid event pattern for the second operation of the second type, wherein the identifying includes:

determining, based on the valid event pattern, a time interval by which any event of a first event type must be followed by at least one event of a second event type;

determining that a first event, of the first event type, in the log file is not followed by any second event of the second event type within the time interval; and presenting or selecting the set of events, in the log file for the second operation, for error analysis corresponding to the error generated by the first operation.

11. The system of claim 10, wherein identifying the error comprises:

determining that any completion time of the first operation is not within a valid time range from a start time of the first operation.

12. The system of claim 10, wherein determining that the first operation depends on the second operation comprises determining that the first operation depends on a third operation, and determining that the third operation depends on the second operation.

13. The system of claim 10, wherein identifying the error comprises:

determining that any completion time of the first operation is not within a valid time range from a start time of the first operation.

14. The system of claim 10, wherein the operations further comprise:

determining that the first operation depends on a plurality of operations by traversing a set of dependency relationships; and comparing valid event patterns for the plurality of operations to corresponding log files for the plurality of operations.

15. The system of claim 10, wherein the operations further comprise:
identifying a valid event pattern for the first operation of the first type; and,
subsequent to comparing the log file of the second operation to the valid event pattern for the second operation of the second type, comparing the valid event pattern for the first operation of the first type to a log file for the first operation of the first type.

16. The system of claim 10, wherein the operations further comprise:
receiving user-defined relationship information;
determining that the first operation depends on a particular plurality of operations based on the user-defined relationship information.

17. A method comprising:
identifying an error generated by a first operation of a first type;
based on identification of the error, triggering and performing real-time event analysis comprising:
determining that the first operation of the first type depends on a second operation of a second type;
wherein determining that the first operation depends on the second operation comprises determining that the second operation must be successfully completed prior to completion of the first operation;
identifying a valid event pattern for the second operation based on metadata associated with the second operation;
comparing a log file, for the second operation, to the valid event pattern for the second operation;
identifying a set of one or more events in the log file for the second operation of the second type which do not match the valid event pattern for the second operation of the second type,
wherein the identifying includes:
determining, based on the valid event pattern, a time interval by which any event of a first event type must be followed by at least one event of a second event type;
determining that a first event, of the first event type, in the log file is not followed by any second event of the second event type within the time interval; and
presenting or selecting the set of events, in the log file for the second operation, for error analysis corresponding to the error generated by the first operation;
wherein the method is performed by at least one device including a hardware processor.

18. The method of claim 17, wherein identifying the error comprises:
determining that any completion time of the first operation is not within a valid time range from a start time of the first operation.

19. The method of claim 17, wherein determining that the first operation depends on the second operation comprises determining that the first operation depends on a third operation, and determining that the third operation depends on the second operation.

20. The method of claim 17, wherein identifying the error comprises:
determining that any completion time of the first operation is not within a valid time range from a start time of the first operation.

* * * * *

UNITED STATES PATENT AND TRADEMARK OFFICE
CERTIFICATE OF CORRECTION

PATENT NO. : 10,467,084 B2  
APPLICATION NO. : 15/624540  
DATED : November 5, 2019  
INVENTOR(S) : Linetskiy Page 1 of 1

It is certified that error appears in the above-identified patent and that said Letters Patent is hereby corrected as shown below:

In the Specification

In Column 1, Line 42, delete "embodiments;" and insert -- embodiments. --, therefor.

In Column 4, Line 30, delete "Drive()" and insert -- Drive(). --, therefor.

In Column 11, Line 27, delete "TQM" and insert -- VM --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*